United States Patent [19]

Schoenheimer et al.

[11] 4,454,890
[45] Jun. 19, 1984

[54] SOLAR HEATER SYSTEM AND VALVE

[75] Inventors: Marcus F. Schoenheimer, Indooroopilly; Lionel A. Gaskell, Bracken Ridge; Keith A. Ackermann, Lawnton, all of Australia

[73] Assignee: Actrol Industries Pty. Ltd., Australia

[21] Appl. No.: 296,174

[22] Filed: Aug. 25, 1981

[30] Foreign Application Priority Data

Aug. 28, 1980 [AU] Australia ............................ PE5309

[51] Int. Cl.³ .............................................. E03B 7/10
[52] U.S. Cl. ...................................... 137/62; 126/420
[58] Field of Search .................. 137/59, 62, 61, 627.5; 126/420; 236/42; 165/39, 34

[56] References Cited

U.S. PATENT DOCUMENTS

| | | |
|---|---|---|
| 1,630,907 | 5/1927 | Royer . |
| 2,716,418 | 8/1955 | Borgerd . |
| 3,364,948 | 1/1968 | Seiffert . |
| 3,853,269 | 12/1974 | Graber . |
| 4,191,166 | 3/1980 | Saarem et al. . |
| 4,216,902 | 8/1980 | Braukmann . |
| 4,280,478 | 7/1981 | Duval et al. . |

FOREIGN PATENT DOCUMENTS

| | | |
|---|---|---|
| 0025150 | 3/1981 | European Pat. Off. . |
| 1578680 | 8/1969 | France . |
| 2441689 | 6/1980 | France . |

Primary Examiner—William E. Wayner
Attorney, Agent, or Firm—Stevens, Davis, Miller & Mosher

[57] ABSTRACT

A Solar Heater system including an absorber panel having an inlet and an outlet connected to a water supply tank. A valve is located in both the inlet and outlet connections and at least the inlet valve is temperature responsive so as to close when the temperature of the panel contents falls below a first predetermined temperature. The outlet valve may be temperature or flow responsive so as to close under the temperature or flow conditions prevailing when the inlet valve closes and thereby isolate the panel from the tank. A temperature responsive dump valve is connected to the panel and opens when the temperature of the panel contents falls below a second predetermined temperature which is lower than the first predetermined temperature and thereby empties the panel contents. The inlet and dump valves are preferably formed by a single combination valve having a temperature responsive element which controls both a primary valve member and a secondary valve member. The primary valve member controls flow between inlet and outlet ports of the valve and the secondary valve member controls flow between the outlet port and a dump port. The temperature responsive element has part thereof exposed externally of the valve body and is substantially insulated against the influence of the temperature conditions existing within the body of the valve.

12 Claims, 11 Drawing Figures

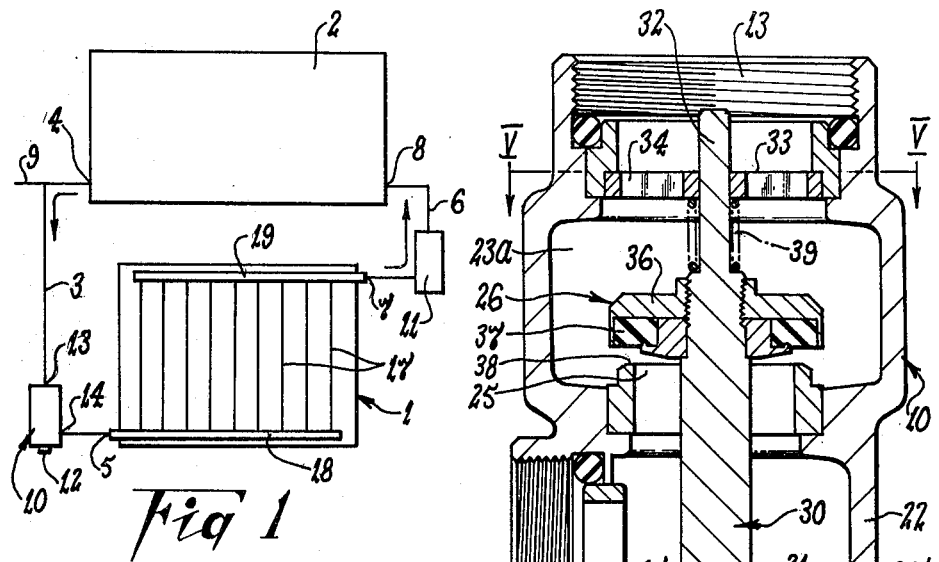
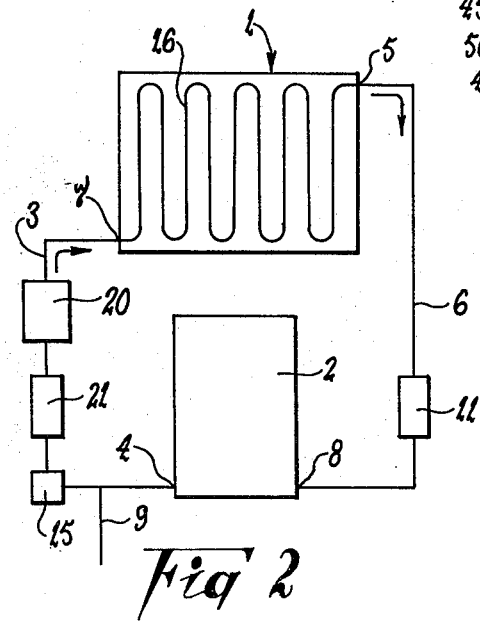
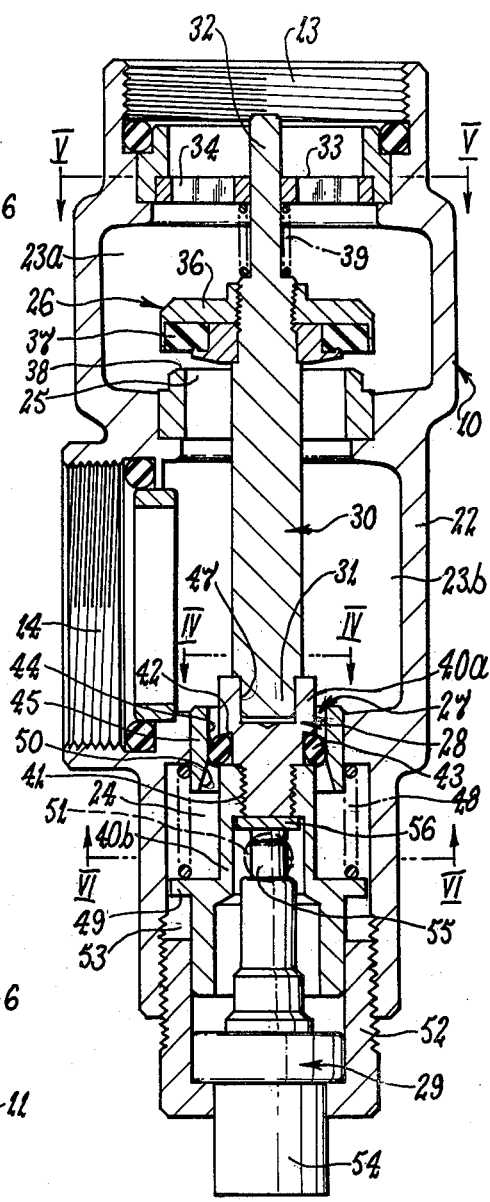

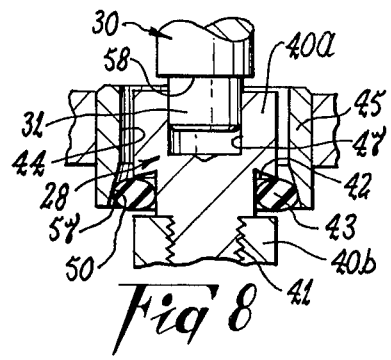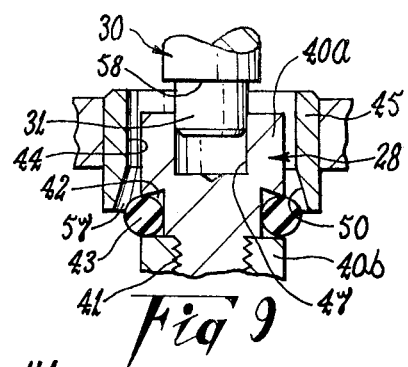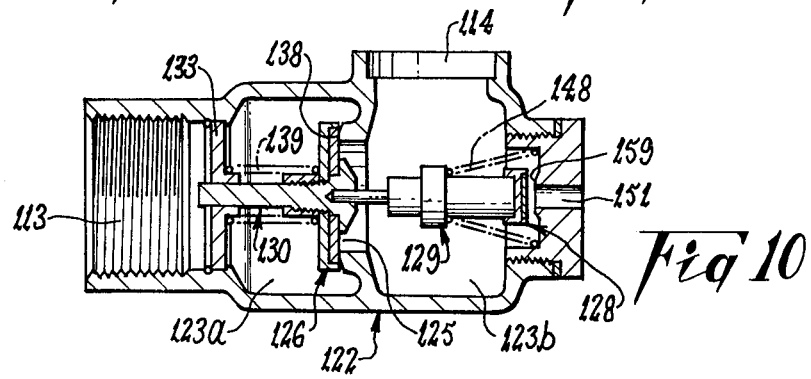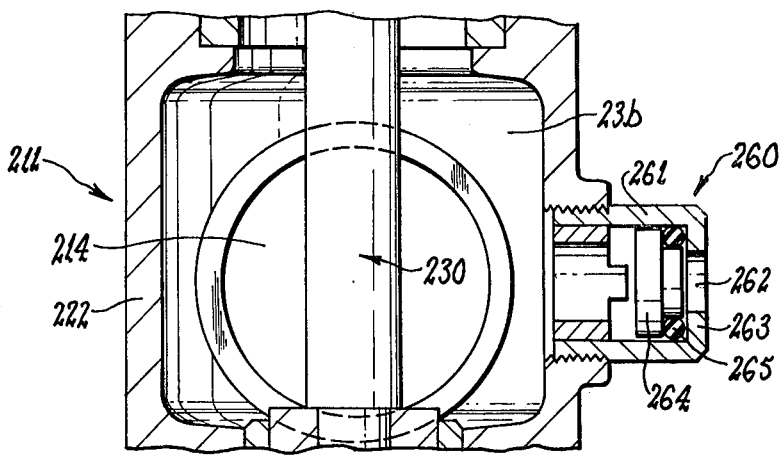

SOLAR HEATER SYSTEM AND VALVE

This invention relates to solar water heating systems of the kind utilizing an absorber panel. Such panels may comprise a plurality of relatively small diameter tubes interconnecting upper and lower headers, or a single tube arranged in serpentine fashion.

In certain climatic conditions ambient temperatures fall below the freezing point of water and a problem arises when solar absorber panels are subjected to such conditions. If the water in a solar absorber panel freezes the resulting expansion of the body of water can cause rupture of the panel tubes.

One method of meeting the foregoing problem is to have temperature responsive valves at both the inlet and the outlet of the panel and which are calibrated to open at a temperature above freezing point—i.e., 3 to 4 degrees Celsius. When those valves open the cold water is emptied from the panel and replaced by stored water from the storage tank. The valves close in response to the higher temperature condition created by the warmer water from the storage tank. A difficulty of that method is that the cycle continues while the low ambient temperature exists so that the mean temperature of the body of water in the tank is progressively lowered.

Another method sometimes adopted is to install a low wattage electric heating element in the lower header and control that element through an appropriate thermostat. This system is expensive to install, is unreliable, and furthermore does not necessarily heat the entire body of water in the panel and is therefore not effective. This method cannot be utilized in a serpentine panel construction.

Another method used for pump type systems is to have the pump actuated by electronic sensors at low temperatures, say 3° to 4° Celsius and closed down when the temperature reaches 8° to 9° Celsius. A difficulty with this method is that as the cycle continues, the cold water from the panel is being pumped into the stored water supply and the mean temperature of the stored water is again being lowered.

A further method involves the use of a closed loop system and introduction of an anti-freeze fluid into the system. This closed loop system is more expensive and the anti-freeze can reduce the absorption efficiency of the panel.

It is an object of the present invention to provide a system which overcomes or at least minimises the problem of water freezing in solar heated panels. It is a further object of the invention to provide a valve for use in such a system.

According to one aspect of the present invention, there is provided a solar heating system including, a water storage container having an inlet and an outlet, a solar panel having an inlet and an outlet and at least one passage therein connecting the inlet and outlet thereof, feed means connecting said container outlet to said panel inlet and including a temperature responsive valve, exhaust means connecting said panel outlet and said container inlet and including a temperature flow responsive valve, both said feed and exhaust valves being operable to close and thereby isolate said panel from said container when the temperature of said water falls below a first predetermined temperature, and a temperature responsive dump valve connected to said panel and being operable to open and thereby drain water from said panel when the temperature of said water falls below a second predetermined temperature, said second predetermined temperature being less than said first predetermined temperature but greater than the temperature at which said water freezes.

According to a further aspect of the invention, there is provided a combination valve including, a hollow body, a chamber formed within said body, said chamber having an inlet section and an outlet section, an orifice within said body through which said inlet and outlet sections communicate, an inlet port and an outlet port formed in said body and connecting with said inlet and outlet sections respectively, a primary valve member mounted within said body and being operable to close and open said orifice to respectively prevent and allow communication between said inlet and outlet sections, a drain port in said body and adapted for communication with one of said chamber sections, a secondary valve member mounted within said body and being operable to either prevent or allow said communication between the drain port and said one primary chamber section, and a temperature responsive element connected to said body and being operable to influence both said primary and secondary valve members such that said primary valve member will close said orifice at a first predetermined temperature and said secondary valve member will allow said communication with said drain port at a second predetermined temperature.

According to a still further aspect of the invention, there is provided a combination valve including, a hollow body, a primary chamber and a secondary chamber formed within said body, said primary chamber having an inlet section and an outlet section, an orifice within said body through which said inlet and outlet sections communicate, an inlet port and an outlet port formed in said body and connecting with said inlet and outlet sections respectively, a primary valve member mounted within said body and being operable to close and open said orifice to respectively prevent and allow communication between said inlet and outlet sections, a transfer port within said body through which said secondary chamber communicates with one of said primary chamber sections, a secondary valve member mounted within said body and being operable to close and open said transfer port to respectively prevent and allow communication between said secondary chamber and said one primary chamber section, a drain port formed in said body and connecting with said secondary chamber, and a temperature responsive element connected to said body and being operable to influence both said primary and secondary valve members such that they will respectively close said orifice and open said transfer port at first and second predetermined temperatures respectively.

According to yet another aspect of the invention, there is provided a temperature responsive valve including, a hollow body, a primary chamber formed within said body, said chamber having an inlet section and an outlet section, an orifice within said body through which said inlet and outlet sections communicate, an inlet port and an outlet port formed in said body and connecting with said inlet and outlet sections respectively, a valve member mounted within said body and being operable to close and open said orifice to respectively prevent and allow communication between said inlet and outlet sections, means biasing said valve member towards an orifice open position, a temperature responsive element connected to said body and being operable to influence said valve member such that it will move against said biasing means to close said orifice at a predetermined temperature, part of said temperature responsive element projecting from said body and being exposed to atmosphere, and means substantially insulating said temperature responsive element against influence of the temperature existing within said chamber.

The essential features of the invention, and further optional features, are described in detail in the following passages of the specification which refer to the accompanying drawings. The drawings however, are merely illustrative of how the invention might be put into effect, so that the specific form and arrangement of the features (whether they be essential or optional features) shown is not to be understood as limiting on the invention.

In the drawings:

FIG. 1 is a diagrammatic view of a solar heating system according to one embodiment of the invention.

FIG. 2 is a diagrammatic view of a solar heating system according to another embodiment of the invention.

FIG. 3 is a cross-sectional view of a combination feed and dump valve for use in the system of FIG. 1 or FIG. 2.

FIG. 8 is a view of the lower section of the valve according to FIG. 3 at a condition approaching a second predetermined temperature.

FIG. 9 is a view similar to FIG. 8 but showing the valve at the second predetermined temperature.

FIG. 10 is a cross-sectional view of an alternative form of combination feed and dump valve.

FIG. 11 shows a modification to the valve according to FIG. 3.

Figure 4:
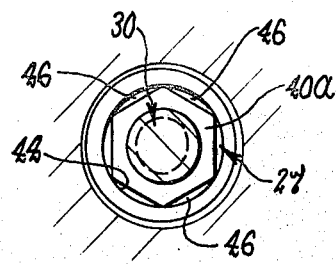
FIG. 4 is a transverse cross-sectional view taken along line IV—IV of FIG. 3.

A system according to the invention is characterised in that at a particular temperature above freezing, the panel is drained of its contents and is isolated from the storage tank so as to remain empty until the temperature of the contents of the panel rises to an appropriate level.

It will be convenient to first describe the system of the invention as applied to thermo-syphon solar heating arrangement and an example of such an arrangement is shown diagrammatically in FIG. 1. In that arrangement, water is circulated through the panel 1 and storage tank 2 simply through thermo-syphon motion—i.e., based on the tendency of warm water to rise. A feed tube 3 connects the outlet 4 from the storage tank 2 to the inlet 5 of the panel 1 and an exhaust tube 6 connects the outlet 7 of the panel 1 to an inlet 8 of the storage tank 2. "Inlet" and "outlet" are so called relative to the direction of water flow under theremo-syphon action. A cold water supply line 9 for make-up purposes may be connected to the feed tube 3 at a location adjacent to the storage tank 2.

In the preferred form shown, a combination drain and shut-off valve 10 is provided in the connection between the panel inlet 5 and the storage tank outlet 4, and a further shut-off valve 11 is provided in the connection between the panel outlet 7 and storage tank inlet 8. Both valves 10 and 11 are temperature responsive in that each incorporates means, preferably in the form of an element, which responds to the temperature created by the environment to which the respective valve 10 or 11 is exposed. The temperature responsive element of the combination valve 10 however, preferably controls both a drain port 12 and a main communication port (not shown) through which the inlet 13 and the outlet 14 of the valve 10 are connected. The temperature responsive element of the panel exhaust valve 11 on the other hand need only control a main communication port.

The temperature created by the environment is generally ambient temperature, but under some circumstances it may be less than ambient. For example, on a foggy night the panel 1 may be subjected to a radiation temperature which is less than ambient temperature. In a preferred form, the temperature responsive element of each of the valves 10 and 11 is arranged to respond to the same temperature as that to which the panel is subjected and as explained above that may be either ambient temperature or a lower radiation temperature. Under some conditions of course, the ambient temperature and the radiation temperature will be the same. In the following description it will be convenient to refer to ambient temperature only and in that context the word "ambient" is to be understood as embracing "radiation" as described above.

When the system is under normal operating conditions—e.g., the ambient temperature is above 6–7 degrees Celsius—the main communication port of each valve 10 and 11 remains open and the drain port 12 of the combination valve 10 is closed. Water can then circulate between the panel 1 and storage tank 2 in the normal manner. If the ambient temperature drops to a predetermined cut-off temperature—e.g., 6° Celsius—the temperature responsive elements of the valves 10 and 11 respond to cause the respective main communication ports to close and thereby isolate the panel 1 from the storage tank 2. At that stage the panel 1 is full of water and no difficulty arises if the temperature does not fall significantly below 6° C. If the temperature does fall however, to approach freezing point, the temperature responsive element of the combination valve 10 responds to a temperature of say 3° C. to cause the drain port 12 to open thereby allowing the panel 1 to drain its contents. Should the temperature then continue to drop towards 0° C. there is no liklihood of the panel 1 being damaged.

When the ambient temperature increases, the reverse of the operation takes place. That is, at or about 3° C. the drain port 12 closes and at or about 6° C. the main communication ports open to allow the panel 1 to be filled from the storage tank 2 and/or the cold water supply line 9. Normal circulation then takes place.

It will be apparent that the arrangement described can be modified in many respects. For example, the valve 11 may be a pressure responsive one-way valve which opens only to allow flow from the panel 1 towards the tank 2. Furthermore, as shown in FIG. 2, the panel drainage function may be achieved through a valve 15 separate from a main shut-off valve 21 at the panel inlet 5. In such a case the drain valve 15 is located between the shut-off valve 21 and the panel 1.

FIG. 2 shows further possible modifications of the system according to FIG. 1. In FIG. 2, the panel 1 includes a serpentine tube 16 forming the passage between the panel inlet 5 and outlet 7, whereas in the FIG.

1 arrangement that passage is provided by a plurality of tubes 17 interconnecting headers 18 and 19 which are connected to the inlet 5 and outlet 7 respectively. Also, in the FIG. 2 arrangement, water circulation is forced through operation of a pump 20 and the positions of the inlets and outlets of the panel 1 and tank 2 have been reversed. It is to be understood however, that both the FIG. 1 and FIG. 2 arrangements are examples only and each is susceptible to substantial variation.

One particular form of the combination valve 10 is shown in FIG. 3 and includes a hollow body 22 having a primary chamber 23 and a secondary chamber 24 formed therein. The primary chamber 23 is divided into inlet and outlet sections 23 (a) and 23 (b) respectively and those sections communicate through an orifice 25 which is subjected to control by a primary valve member 26. An inlet port 13 communicates with the inlet section 23 (a) and in the FIG. 1 arrangement for example, the feed line 3 connects port 13 to the tank outlet 4. An outlet port 14 communicates with the outlet section 23 (b) and again considering the FIG. 1 arrangement the port 14 is connected to the panel inlet 5. The outlet section 23 (b) communicates with the secondary chamber 24 through a transfer port 27 (see FIG. 4) and that port is controlled by a secondary valve member 28.

In the example valve construction according to FIG. 3, the orifice 25 and the transfer port 27 are substantially co-axial and the valve members 26 and 28 are arranged for movement along the same axis. A single temperature responsive element 29 influences operation of both valve members 26 and 28 and that element 29 is connected to the valve body 22 in a manner hereinafter described.

Figure 5:
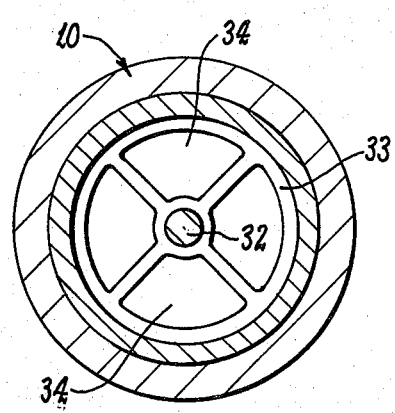
FIG. 5 is a transverse cross-sectional view taken along line V—V of FIG. 3.

The particular primary valve member 26 shown in FIG. 3 includes a stem 30 which extends axially through the orifice 25 and has one end portion 31 attached to the secondary valve member 28 and its opposite end portion 32 slidably mounted in a support spider 33. The spider 33 is secured to the valve body 22 against relative movement and has a number of openings 34 through which water passes from the inlet port 13 to the primary chamber 23 (see FIG. 5). A disc section 36 is fixed to the stem 30 at a location between its ends and carries a resilient annular sealing element 37 which is adapted to engage a seat 38 surrounding the orifice 25. The disc 36 is located between the inlet port 13 and the valve seat 38 and is urged towards the orifice closing position by a compression spring 39.

The secondary valve member 28 of the example shown includes a body 40 formed of two interconnected parts 40 (a) and 40 (b). The parts 40 (a) and 40 (b) are shown connected through co-operable screw threads 41, but other types of connections may be adopted. A circumferential groove 42 is formed between opposed surfaces of the two parts 40 (a) and 40 (b) and contains a resilient "O" ring 43 which serves as a sealing element of the valve member 28. The part 40 (a) preferably has a hexagonal (or other non-circulator) external shape as shown in FIG. 4 so as to slidably engage within a cylindrical bore 44 of a sleeve 45 in such a manner that a plurality of through passages 46 are formed between the part 40 (a) and the bore 44. Such co-operation between the part 40 (a) and sleeve 45 provides a guide for axial movement for the valve member 28. It is further preferred that the end portion 31 of the primary valve stem 30 is slidably located in an axial bore 37 formed in the adjacent end of the secondary valve part 40 (a).

Figure 6:
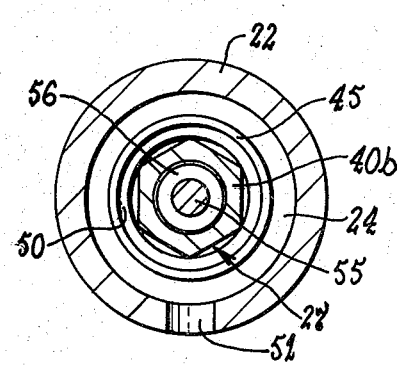
FIG. 6 is a transverse cross-sectional view taken along line VI—VI of FIG. 3.

A compression spring 48 preferably urges the secondary valve member 28 towards a port opening position and as shown that spring 48 may coact between the valve body 22 and a flange 49 of part 40 (b) of the secondary valve 28. The sleeve 45 has a frusto-conical bore 50 which merges with the cylindrical bore 44 and is located remote from the primary valve chamber 23. The "O" ring 43 is adapted to sealingly engage against the surfaces of both the bores 44 and 50 as hereinafter described. A drain port 51 is formed through the valve body 22 to communicate with the secondary chamber 24 as best shown in FIG. 6.

The temperature responsive element 29 may be secured to the valve body 22 by means of an end cap 52 which threadably engages within a bore 53 of the body 22. As shown, the element 29 is preferably substantially coaxial with the valve members 26 and 28 and has a part 54 which projects out of the end cap 52 for exposure to the surrounding atmosphere. A movable stem 55 projects from the body of the element 29 at the end thereof remote from the part 54 and engages the secondary valve member 28 either directly or through the intermediary of another member such as an insulating disc 56 as shown in FIG. 3.

It is preferred to substantially insulate the element 29 from the influence of the temperature of the contents of the chambers 23 and 24. For that purpose, the disc 56, valve member part 40 (b) and the end cap 52 may be made from a material such as "celcon" having low heat conduction characteristics. Those members also substantially insulate the element 29 against heat conduction from the valve body 22.

At least the exposed portion of the part 54 of the temperature responsive element 29 is preferably coloured the same as that portion of the solar heating panel 1 through which ambient temperature influences the temperature of the panel contents. That is, the exposed outer broad surface of the panel 1 and that surface is generally coloured black in which event, the part 54 is also preferably coloured black. The aim is to have the temperature responsive element 29 subjected to substantially the same solar radiation temperature as that which affects the temperature of the contents of the heating panel 1. In particular, the temperature responsive element 29 and the panel 1 are subjected to the same environmental conditions so that each is affected to substantially the same extent by dew point and other aspects which influence the temperature of the water in the panel 1. It may take some time for a change in the temperature of the contents of the panel 1 to be accurately reflected within the body 22 of the valve 10, so the arrangement described ensures that the element 29 will respond quickly to changes which influence the internal conditions of the panel 1 so there is substantial correspondence between those conditions and the operation of the element 29.

The valve 10 will normally have the condition shown in FIGS. 3,—i.e., at ambient temperatures above the first predetermined temperature which may be 6° or 7° C. for example. In that condition, the orifice 25 is open and the transfer port 51 is closed so water can flow between the inlet 13 and the outlet 14, but flow to the chamber 24 is prevented.

Figure 7:
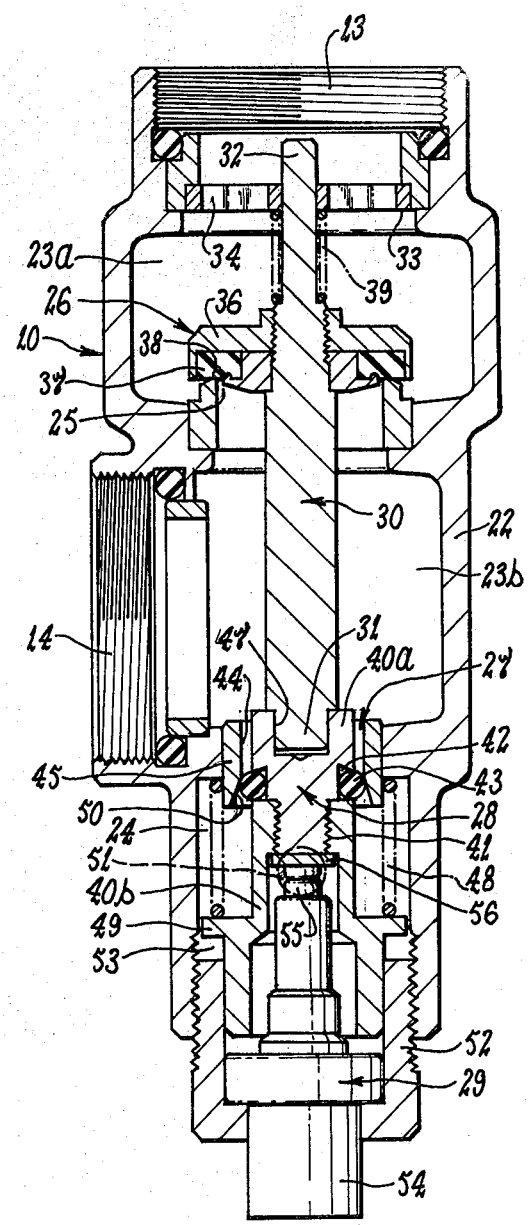
FIG. 7 is a view similar to FIG. 3 but showing the condition of the valve at a first predetermined temperature.

Assuming the ambient temperature drops below say 6° the stem 55 of the element 29 will retract into the body of the element 29 to a distance sufficient to allow the valve 26 to close under the influence of spring 39, but not sufficient to allow the valve 28 to open. That situation is shown in FIG. 7 and results in the section 23 (b) of the primary compartment being isolated from the valve inlet 13. Further movement of the valve stem 30 towards the secondary chamber 24 is prevented by engagement between the valve seat 38 and the sealing element 37.

When the stem 55 is retracting as described above, the valve member 28 will follow that movement under the influence of the spring 48. The valve member 26 in turn follows the movement of the valve member 28 because of the influence of spring 39. All three components 55, 28 and 26 therefore move downwards as a single unit, at least until the FIG. 7 position is reached. In the course of that movement the "O" ring 43 emerges from the cylindrical bore 44 and enters into the small diameter end of the frusto-conical bore 50. At the position shown in FIG. 7 the "O" ring 43 nevertheless continues to maintain a fluid tight seal with the surface of bore 50.

If the ambient temperature then drops below the second predetermined temperature, which may be 3° or 4° Centigrade for example, the stem 55 will retract further into the body of the element 29 and the valve member 28 follows that movement under the influence of the spring 48. The primary valve stem 30 however, is held against movement with the valve member 28 as mentioned above so that the secondary valve part 40 (a) slides along the stem end 31 towards the position shown in FIG. 8. As a result of the foregoing, the "O" ring 43 is moved further towards the large diameter end of the bore 50 and its sealing influence is progressively diminished. The pressure differential existing between the primary compartment section 23 (b) (high pressure) and the secondary compartement 24 (low pressure) causes the "O" ring 43 to be compressed in the axial direction of the valve member 28 thereby maintaining the sealing contact between the "O" ring 43 and the surface of the bore 50. A position is reached however, at which the pressure within the compartment section 23 (b) overcomes the sealing influence of the "O" ring 43 and a gap 57 appears between the "O" ring 43 and the surface of the bore 50 as shown in FIG. 9. That gap 57 is created relatively quickly immediately the seal is breached because the resulting reduction in pressure differential on opposite sides of the "O" ring 43 causes the "O" ring 43 to suddenly return to its uncompressed state. Water is then able to pass from the primary chamber section 23 (b) into the secondary chamber 24 and then out through the drain port 51. Assuming the valve 10 is connected into a system as shown in FIG. 1, that operation can result in the panel 1 being drained of its contents. In that regard, the valve 11 would have closed at substantially the same time as the orifice 25 of the valve 10 was closed.

When the ambient temperature starts to rise, the element 29 will respond by moving the stem 55 outwardly towards the transfer port 27. The secondary valve member 28 is thereby moved against the influence of the spring 48 and progressively moves towards a position at which the "O" ring 43 sealingly engages the surface of the bore 50. In due course, assuming a continuing increase in temperature, the secondary valve part 40 (a) will engage the shoulder 58 on the primary valve stem 30 and the primary valve member 26 will be thereafter moved to open the orifice 25. The "O" ring 43 will of course be moved beyond the frusto-conical bore 50 into the cylindrical bore 44.

The temperature responsive element may be of a conventional kind having within it a material which expands and contracts in response to variations in temperature. The stem 55 of the element 29 is arranged to move with that expansion and contraction.

The desired sudden opening of the transfer port 27 can be achieved in several ways. In the construction shown, it is achieved in part by the taper of the frusto-conical bore 50 and the relatively large cross-sectional size of the "O" ring 43. By way of example, the included angle of the bore 50 may be 30°, or thereabouts, and the inner diameter of the "O" ring 43 may be in the range of 50 to 60% of the outer diameter (preferably approximately 55%).

It is possible to achieve the desired shut-off and drainage facility in valve constructions different to that shown in FIGS. 3 to 9. One possible variation is shown in FIG. 10 and components of that construction which correspond to components of the FIG. 3 construction have been given like reference numerals but in the series 100-199.

In the FIG. 10 construction, the temperature responsive element 129 acts between the valve member 128 and a cushioning or biasing spring 148 which bears against part of the valve body 122. The cushioning spring 148 is designed to impose a lower force on the temperature responsive element 129 than does the biasing spring 139 of the valve member 128. In this construction there is no equivalent to the secondary chamber of the construction according to FIG. 3 and the secondary valve 128 is of relatively simple construction.

In the cold unexpanded condition of the temperature responsive element 129, the valve member 126 is closed against the valve seat 138 surrounding the orifice 125 and the cushioning spring 148 holds the temperature responsive element 129 and valve member 128 well clear of the seat 159 surrounding the port 151 as shown in FIG. 10. As the temperature increases and the element 129 expands the cushioning spring 148 is compressed but the valve member 126 initially remains closed under the action of its biasing spring 139. At a temperature of say 3° C., or thereabouts, the valve member 128 engages the valve seat 159 so as to close the port 151 and subsequent expansion of the element 129 acts against the valve member 216. When the temperature reaches say 6° C., or thereabouts, the expansion force is sufficient to move the valve member 126 so that the orifice 125 is opened against the action of the biasing spring 139. The reverse operation of course occurs as the temperature falls.

The valve 11 which is used at the panel inlet may be substantially the same as either of the two combination valves described above. Alternatively, the valve 11 may be substantially as described except for omission of the drain port or, in the FIG. 3 type arrangement, closure of the transfer port under all conditions.

In a preferred arrangement, the valve 11 is substantially as described in relation to FIGS. 1 to 9 except that a vacuum break facility is added and such a modification is shown in FIG. 11. Components of that construction which correspond to components of the FIGS. 1 to 9 construction will be given like reference numerals except that they will be in the series 200-299.

The FIG. 11 construction includes an air valve 260 which is operable to connect the chamber section 23 (b) with atmosphere. The valve 260 can be of any appropriate construction, but in the arrangement shown it includes a cylindrical housing 261 having an opening 262 formed through an end wall 263 and having its oppposite end communicating with the chamber section 23 (b). A piston 264 is loosely mounted within the housing 261 and engages an "O" ring 265 to prevent passage of air or other fluid through the opening 262.

If the valve 211 is included in the FIG. 1 system the air valve 260 will avoid the formation of a vacuum within the panel 1. Such a vacuum can be created during draining of the panel 1 as a consequence to opening of the draining port 12, and under those circumstances the resulting pressure differential across the piston 264 will cause the valve 260 to open so that the interior of the panel is subjected to atmospheric pressure. The valve 260 will close as the panel 1 is being refilled because of the high pressure then existing within the panel.

The air valve 260, or a similar valve can be incorporated in any form of valve 11 as might be used in systems of the kind described in relation to FIGS. 1 and 2. Alternatively, such an air valve may be located separate from the exhaust valve 11 so as to be located within the panel 1 or between the panel 1 and the exhaust valve 11.

It will be apparent from the foregoing that the present invention provides an improved solar heating system in that the panel is effectively protected against the consequences of low temperature conditions. Furthermore, the basic temperature responsive valve of the present invention has the substantial advantage of responding to changes in the environmental conditions rather than the less accurate changes in the internal conditions of the valve itself. The combination valve of the invention provides a relatively simple and effective means of achieving control over both main flow and drainage facilities.

Finally, it is to be understood that various alterations, modifications and/or additions may be introduced into the constructions and arrangements of parts previously described without departing from the spirit or ambit of the invention.

Having now described my invention what I claim as new and desire to secure by Letters Patent is:

1. A combination valve including, a hollow body, a chamber formed within said body, said chamber having an inlet section and an outlet section, an orifice within said body through which said inlet and outlet sections communicate, an inlet port and an outlet port formed in said body and connecting with said inlet and outlet sections respectively, a primary valve member mounted within said body for relative movement and being operable to close and open said orifice to respectively prevent and allow communication between said inlet and outlet sections, a drain port in said body and adapted for communication with one of said chamber sections, a secondary valve member mounted within said body for movement relative to both said body and said primary valve member and being operable to adopt either a closed or an open position at which it prevents and allows respectively said communication between the drain port and said one primary chamber section, a temperature responsive element connected to said body and to at least one said valve member and being operable to control the opening and closing movement of both said valve members, the arrangement being such that said primary valve member moves towards the closed position with falling temperature and closes said orifice at a first predetermined temperature and said secondary valve member allows said communication with said drain port at a second predetermined temperature which is lower than said first predetermined temperature, and part of said temperature responsive element is exposed to atmosphere external of said body so that said element operates solely as a consequence of direct response to ambient or radiation temperature.

2. A combination valve according to claim 1, wherein said chamber forms a primary chamber and a secondary chamber is also formed within said body, a transfer port is provided within said body for allowing communication between said secondary chamber and one of said primary chamber sections, said secondary valve member is operable to close and open said transfer port to respectively prevent and allow communication between said secondary chamber and said one primary chamber section, and said drain port connects with said secondary chamber.

3. A combination valve according to claim 2 wherein said primary valve member is spring influenced towards the orifice closed position, said secondary valve member is spring influenced towards the transfer port open position, and said temperature responsive element is operable at temperatures above said first and second predetermined temperatures to move each said valve member against the respective said spring influence.

4. A combination valve according to claim 2 wherein said transfer port is defined at least in part by a frusto-conical bore, said secondary valve member includes a body part and a resilient "O" ring carried by said body part, and said "O" ring is engageable with the surface of said frusto-conical bore to seal thereagainst and thereby close said transfer port.

5. A combination valve according to claim 13, wherein said orifice and said transfer port are substantially coaxial and said primary and secondary valve members are movable relative to said body along that axis, said secondary valve member is interposed between said temperature responsive element and said primary valve member, said temperature responsive element influences said primary valve member through the intermediary of said secondary valve member.

6. A combination valve according to claim 14, wherein said transfer port includes a cylindrical bore which merges with the small diameter end of said frusto-conical bore, and said "O" ring is moved into said cylindrical bore and seals against the surface thereof during movement of said primary valve member away from said orifice closed position.

7. A combination valve according to claim 6, wherein said secondary valve member includes a guide part which is slideably located within said cylindrical bore, and passage means is provided in said guide part for fluid to pass between said secondary chamber and said one primary chamber section.

8. A combination valve according to claim 2, wherein said temperature responsive element has a part projecting out of said body and exposed to atmosphere, and means substantially insulating said temperature responsive element from said primary and secondary chambers so that said temperature responsive element is substantially unaffected by the temperature of the contents of said chambers.

9. A combination valve according to claim 2, wherein said outlet section constitutes said one primary chamber section.

10. A combination valve including, a hollow body, a chamber formed within said body, said chamber having an inlet section and an outlet section, an orifice within said body through which said inlet and outlet sections communicate, an inlet port and an outlet port formed in said body and connecting with said inlet and outlet sections respectively, a primary valve member mounted within said body for relative movement and being operable to close and open said orifice to respectively prevent and allow communication between said inlet and outlet sections, a drain port in said body and adapted for communication with one of said chamber sections, a secondary valve member mounted within said body for relative movement and being operable to adopt either a closed or an open position at which it prevents and allows respectively said communication between the drain port and said one primary chamber section, means connecting said valve members and allowing said secondary valve member to move relative to the primary valve member when the primary valve member is in the closed position so that there will be relative movement between said valve members as said secondary valve member approaches either its closed or open position, a temperature responsive element connected to said body and to said secondary valve member and being operable to control the opening and closing movements of both said valve members, said control on the primary valve member being effected through said secondary valve member, the arrangement being such that said primary valve member moves towards the closed position with falling temperature and closes said orifice at a first predetermined temperature and said secondary valve member allows said communication with said drain port at a second predetermined temperature which is lower than said first predetermined temperature, and part of said temperature responsive element is exposed to atmosphere external of said body so that said element operates solely as a consequence of direct response to ambient or radiation temperature.

11. A valve according to claim 10, including means which substantially insulates said temperature responsive element against the influence of the temperature existing within said chamber.

12. A valve according to claim 10, wherein said insulating means substantially insulates said temperature responsive element against the influence of the temperature of said valve body.

* * * * *